United States Patent [19]

White

[11] Patent Number: 5,172,543
[45] Date of Patent: Dec. 22, 1992

[54] STARTING SYSTEM FOR A GAS TURBINE AND METHOD OF STARTING A GAS TURBINE

[75] Inventor: Robert C. White, San Diego, Calif.

[73] Assignee: Sundstrand Corporation, Rockford, Ill.

[21] Appl. No.: 633,794

[22] Filed: Dec. 26, 1990

[51] Int. Cl.$^5$ .................. F02C 7/26; F02G 3/00
[52] U.S. Cl. .................. 60/39.02; 60/39.142; 290/38 R
[58] Field of Search .................. 60/39.02, 39.142; 290/38 R, 48, DIG. 1, DIG. 3

[56] References Cited

U.S. PATENT DOCUMENTS

| | | | |
|---|---|---|---|
| 3,772,526 | 11/1973 | Alwers | 290/38 R |
| 4,350,236 | 9/1982 | Stahlhuth | 290/48 |
| 4,926,631 | 5/1990 | Sorenson | 60/39.142 |

FOREIGN PATENT DOCUMENTS

| | | |
|---|---|---|
| 0113241 | 6/1984 | Japan . |
| 0045941 | 2/1987 | Japan .................. 60/39.142 |
| 2700827 | 7/1978 | Netherlands . |
| 0811919 | 1/1982 | U.S.S.R. . |
| 0592639 | 9/1947 | United Kingdom . |
| 943449 | 12/1966 | United Kingdom . |

OTHER PUBLICATIONS

Treager, "Aircraft Gas Turbine Engine Technology", 1970, pp. 268-269.

Primary Examiner—Richard A. Bertsch
Assistant Examiner—Howard R. Richman
Attorney, Agent, or Firm—Antonelli, Terry Stout & Kraus

[57] ABSTRACT

A starting system (10) for a gas turbine (24) in accordance with the invention includes an electric motor (14); and a clutch (20) having an input (18) for receiving torque from the electric motor when the electric motor is activated during starting of the turbine and an output (22) for rotating the gas turbine during starting of the turbine, the clutch having a torque transfer characteristic between the input and the output with no torque being transferred when a rotational speed of the input is below a set speed which is a fraction of a speed at which the gas turbine is self-sustaining in producing output torque and transferring torque above the set speed between the input and output with the set speed being chosen with respect to a power output characteristic of the electric motor as a function of speed of the motor which produces acceleration of the motor to self-sustaining speed while minimizing energy required for starting.

12 Claims, 2 Drawing Sheets 5,172,543

STARTING SYSTEM FOR A GAS TURBINE AND METHOD OF STARTING A GAS TURBINE

TECHNICAL FIELD

The present invention relates to starting systems for gas turbines and methods of starting gas turbines.

BACKGROUND ART

British Patent 943,449 discloses a system for starting a gas turbine which utilizes compressed air stored in a reservoir for starting a combustion engine. After the combustion engine has speeded up, a centrifugal clutch engages and drives the rotor of the gas propulsion turbine. While the starting system disclosed in British Patent 943,449 relies upon a clutch to couple starting torque to the gas turbine after the starting motor has reached an initial speed, the disclosed system does not address energy consumption during starting.

Conventional electric starting systems for gas turbines directly couple the gas turbine to the electric starter motor. This configuration has the disadvantage that loading of the drive shaft of the electric motor with the rotor of the gas turbine causes considerable starting current to be drawn when the starting sequence for the gas turbine is initiated. The drawing of high starting currents degrades the battery voltage which can interfere with specifications of the battery for applications in airframes, such as that proposed for the Boeing 737-500 in which the starting motor may not draw more than 370 amps or degrade the battery voltage to less than 18 volts. Additionally, electric motors reach peak efficiency at approximately 50% of their maximum speed with minimum efficiency occurring at starting. As a result, starting losses are minimized by accelerating the electric starting motor as rapidly as possible up to the speed at which the turbine is self-sustaining.

DISCLOSURE OF INVENTION

The present invention is a starting system and method of starting a gas turbine using an electric motor in which the coupling of torque from the electric motor to the turbine rotor is controlled by a clutch having a characteristic which does not transmit torque to the turbine rotor until the electric motor reaches a set speed which is a fraction of a speed at which the gas turbine is self-sustaining in producing output torque and transferring torque above the set speed between the input and output of the clutch with the set speed being chosen with respect to a power output characteristic of the electric motor as a function of speed of the motor which produces acceleration of the turbine to self-sustaining speed while minimizing energy required for starting. Preferably, the set speed occurs in a segment of the power output characteristic of the electric motor in which the highest torque is produced. Activation of the electric motor in the aforementioned characteristic of the power output characteristic of the electric motor minimizes energy consumption which reduces the adverse effects of loading of the battery which occur in the prior art.

A starting system for a gas turbine in accordance with the present invention includes an electric motor; a clutch having an input for receiving torque from the electric motor when the electric motor is activated during starting of the turbine and an output for driving the gas turbine during starting of the turbine, the clutch having a torque transfer characteristic between the input and the output with no torque being transferred when a rotational speed of the input is below a set speed which is a fraction of a speed at which the gas turbine is self-sustaining in producing output torque and transferring torque above the set speed between the input and output with the set speed being chosen with respect to a power output characteristic of the electric motor as a function of the speed of the motor which produces acceleration of the motor to self-sustaining speed while minimizing energy required for starting. The power output characteristic of the motor comprises three speed segments defining a horsepower output of the electric motor beginning from stop with a first segment containing an increasing slope of horsepower as a function of rotational speed of the motor, a second segment containing the set speed and in which a maximum slope of horsepower as a function of rotational speed occurs with rotational speeds in the second segment being greater than rotational speeds in the first segment in which also occurs the production of maximum and a third segment containing a slope of horsepower as a function of rotational speed which is less than the second segment and which contains a maximum horsepower output with rotational speeds in the third segment being greater than rotational speeds in the second segment; and the set speed occurs when the electric motor is transferring torque to the input of the clutch during rotation of the motor with a rotational speed within the second segment and the electric motor is not coupled to the turbine in the first segment and is coupled to the turbine at least within the second segment. The electric motor is also activated during the third segment. The electric motor draws current during the starting of the turbine with a characteristic of current as a function of rotational speed of the electric motor having a segment with a magnitude less than a current which would be drawn by the electric motor if the turbine was being driven by the electric motor from a stop during starting of the turbine at corresponding speeds which occurs prior to torque being transferred from the output to the output of the clutch.

A method of starting a gas turbine with a starting system having an electric motor coupled to an input of a clutch with an output of the clutch driving the gas turbine during starting in accordance with the invention includes activating the electric motor to cause the electric motor to accelerate to a first rotational speed without coupling torque from the input to the output of the clutch; and coupling torque from the input of the clutch to the output of the clutch after the motor has accelerated to above the first rotational speed with the first rotational speed being chosen with respect to a power output characteristic of the electrical motor as a function of speed of the motor which produces acceleration of the motor turbine to self-sustaining speed while minimizing energy required for starting. The power output characteristic of the motor comprises three speed segments defining a horsepower output of the electric motor beginning from stop with a first segment containing an increasing slope of horsepower as a function of rotational speed of the motor, a second segment containing the set speed and in which a maximum slope of horsepower occurs with rotational speeds in the second segment being greater than rotational speeds in the first segment in which the production of maximum torque also occurs and a third segment containing a slope of horsepower as a function of rotational speed which is less than the second segment and which contains a maximum horsepower output with rotational speeds in the third segment being greater than rotational speeds in the second segment; and the set speed occurs when the electric motor is transferring torque to the input of the clutch during rotation of the motor with a rotational speed within the second segment and the electric motor is not coupled to the turbine in the first segment and is coupled to the turbine at least within the second segment. The electric motor is activated within the third segment. The electric motor draws current during the starting of the turbine with a characteristic of current as a function of rotational speed of the motor having a segment having a current magnitude less than a current which would be drawn by the electric motor if the turbine was being driven by the electric motor from a stop during starting of the turbine at corresponding speeds which occurs prior to torque being transferred from the input to the output of the clutch.

BEST MODE FOR CARRYING OUT THE INVENTION

Figure 1:
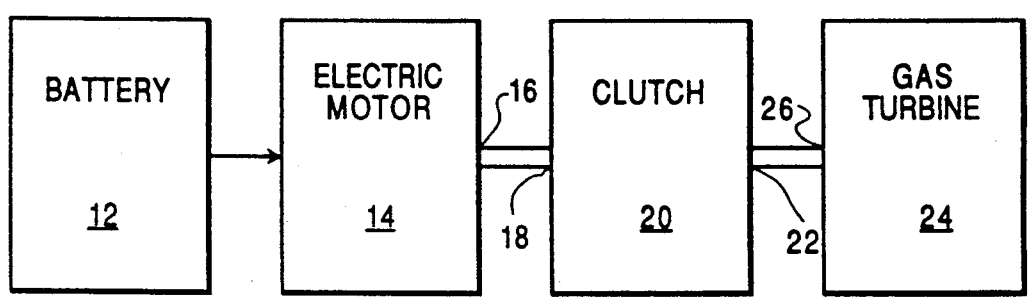
FIG. 1 illustrates a block diagram of the present invention.

FIG. 1 illustrates a block diagram of a starting system 10 for a gas turbine in accordance with the present invention. The starting system is comprised of a battery 12 which supplies electrical current at a potential such as 28 volts, which is used in airframe applications, to an electric motor 14 which may be a DC motor of diverse designs. An output shaft 16 of the electric motor 14 is coupled to an input shaft 18 of a clutch 20 having an output shaft 22 which is connected to an input shaft 26 of gas turbine 24. The clutch 20 may be without limitation a centrifugal clutch or an overrunning clutch.

The clutch 20 has a torque transfer characteristic between the input shaft 18 and the output shaft 22 with no torque being transferred when a rotational speed of the input is below a set speed which is a fraction of a speed at which the gas turbine is self-sustaining in producing output torque. The clutch 20 transfers torque from the input 18 to the output 22 above the set speed with the set speed being chosen with respect to a power output characteristic of the electric motor as a function of speed of the motor which produces acceleration of the motor to self-sustaining speed while minimizing energy required for starting as described below with respect to FIGS. 2-4.

Figure 2:
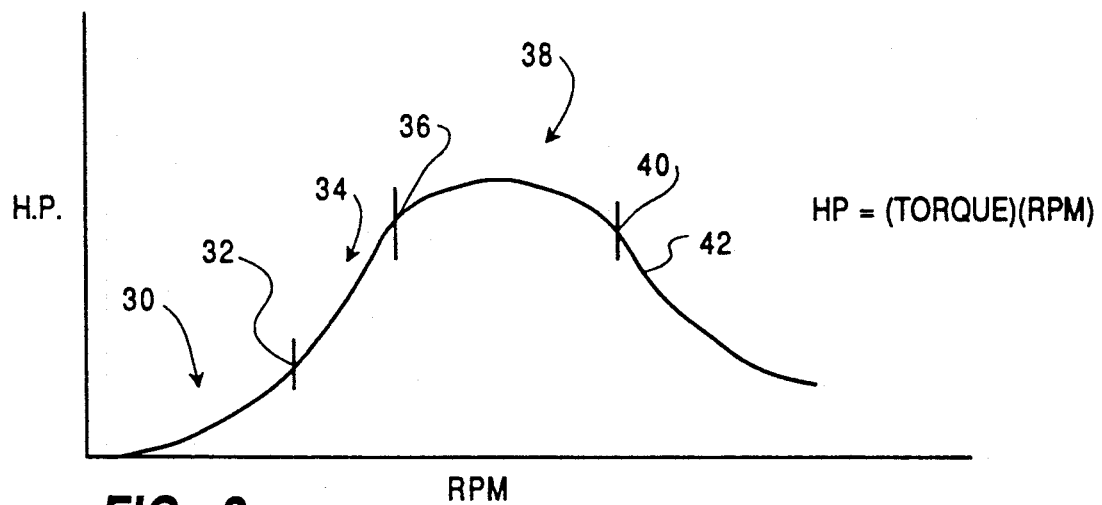
FIG. 2 illustrates a power output characteristic of the electric motor which is utilized in starting a gas turbine in accordance with the present invention.

FIG. 2 illustrates the power output characteristic of the electric motor 14 as a function of speed. Like reference numerals identify like parts in FIGS. 2-4. The power output characteristic is comprised of three speed segments defining a horsepower output of the electric motor beginning from stop with a first speed segment 30 containing an increasing slope of horsepower as a function of rotational speed of the motor, which ends at point 32, a second speed segment 34 which extends from point 32 to point 36 in which a maximum slope of horsepower as a function of rotational speed and maximum torque occurs and torque is coupled from the input 18 to the output 22 and a third speed segment 38 which extends from point 36 to point 40 containing a slope of horsepower as a function of rotational speed which is less than the second segment and which contains a maximum horsepower output. Rotational speeds in the second speed segment 34 are greater than rotational speeds in the first speed segment 30 and rotational speeds in the third segment 38 are greater than rotational speeds in the second segment. Self-sustaining speed occurs at point 42 at which point the electric motor 14 is deactivated which decouples the gas turbine 24 from the remainder of the starting system. Choosing the point at which the clutch 20 couples torque from the input 18 to the output 22 within the second segment 34 minimizes energy required for starting as a consequence of providing the highest torque coupling to the gas turbine 24 during the starting sequence and reduces the loading of the battery thus making it easier to achieve electrical specifications which control turbine starting in airframes.

Figure 3:
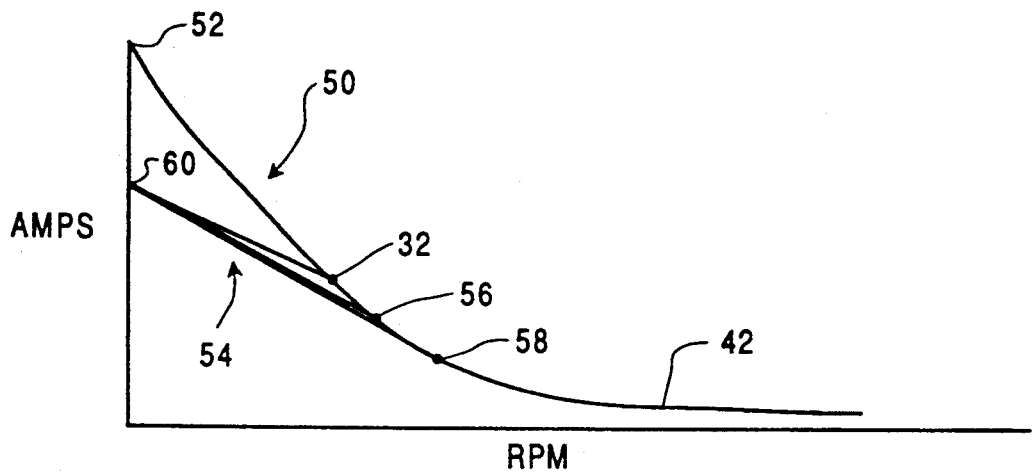
FIG. 3 illustrates the current drawn as a function of motor speed for starting a gas turbine when the electric motor is directly connected to the rotor of the gas turbine as in the prior art and when the electric motor is coupled to the gas turbine through a clutch in accordance with the present invention.

FIG. 3 illustrates the current drawn by a prior art electric starting system for a gas turbine in which the electric motor is connected to the gas turbine without a clutch as a function of rotational speed of the electric motor and the current drawn by the present invention as a function of rotational speed of the electric motor. Like reference numerals identify like parts in FIGS. 2 and 3. The segment 50 located between point 52 and point 32 represents a portion of the current drawn by the prior art direct drive electric starting system in which the electric motor 14 is connected to the gas turbine 24 for starting. The family of segments 54 represent a corresponding portion of the current drawn by the present invention for set speeds at which no torque is coupled from the input 18 to the output 22 of the clutch 20 at points 32, 56 and 58.

The energy consumed during starting of the prior art system represented by the curve from point 52 to point 42 and the family of curves from point 60 in which starting current is drawn as a consequence of only the load represented by the rotor of the electric motor and the input 18 of the clutch 20 and point 42 is represented by the integral of the aforementioned curves. As is apparent, the area under the curve in the prior art starting sequence is substantially greater than the family of areas under the curves achieved with the present invention in which the point at which torque is coupled to the output 22 of the clutch 20 from the input 18 is within the second segment 34.

Figure 4:
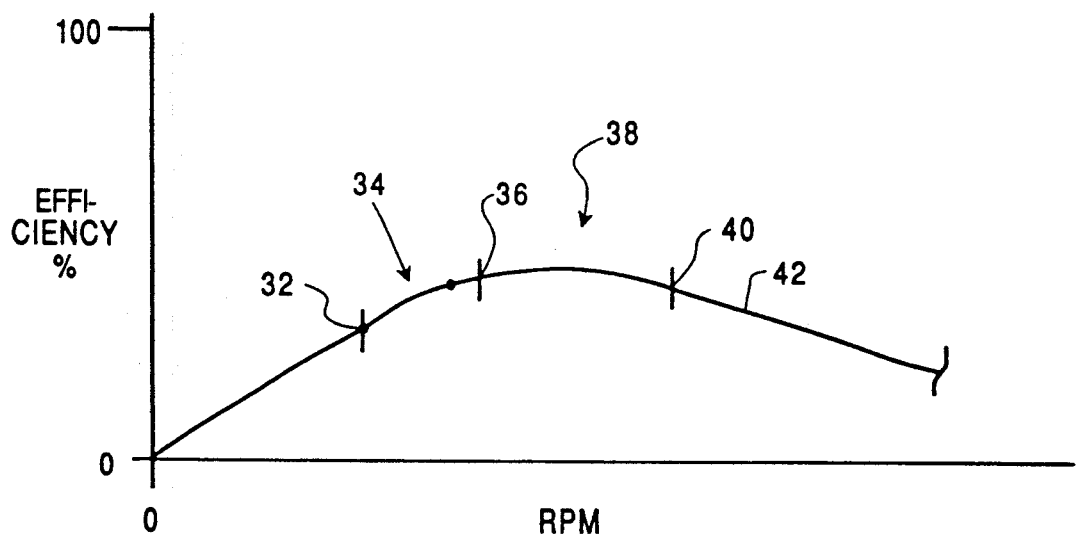
FIG. 4 illustrates a graph of the efficiency of the electrical motor as a function of rotational speed.

FIG. 4 represents a graph of efficiency of the electrical motor 14 as a function of speed of rotation. The maximum efficiency of the electric motor occurs in the second and third segments 34 and 38. As a result, accelerating the electric motor 14 rapidly into the second segment 34 and third segment 38 achieves operation where the efficiency of the electric motor is highest which minimizes consumption of electric energy.

A method of starting the gas turbine 24 with the starting system 10 having electric motor 14 coupled to the input 18 of clutch 20 with the output 22 of the clutch driving the gas turbine during starting in accordance with the invention includes activating the electric motor to cause the electric motor to accelerate to a first rotational speed without coupling torque from the input to the output of the clutch. Torque is coupled from the input of the clutch to the output of the clutch after the motor has accelerated to above the first rotational speed with the first rotational speed being chosen with respect to a power output characteristic of the electric motor as a function of the speed of the electric motor which produces acceleration of the turbine to self-sustaining speed while minimizing energy required for starting. The set speed occurs within the second segment 34 and the clutch 20 is not engaged in the first segment 30 to couple the input to the output and is engaged within the second segment 34. The motor 14 is activated in the first and second segments 30 and 34, and is preferably activated in the third segment 38. Deactivation of the electric motor occurs when the gas turbine reaches self-sustaining speed.

While the invention has been described in terms of its preferred embodiments, it should be understood that numerous modifications may be made thereto without departing from the spirit and scope of the invention as defined in the appended claims. It is intended that all such modifications fall within the scope of the appended claims.

I claim:

1. A method of starting a gas turbine with a starting system having an electric motor coupled to an input of a clutch with an output of the clutch driving the gas turbine during starting comprising:
   activating the electric motor to cause the electric motor to accelerate to a first rotational speed without coupling torque from the input to the output of the clutch; and
   coupling torque from the input of the clutch to the output of the clutch after the motor has accelerated to above the first rotational speed with the first rotational speed being chosen with respect to a power output characteristic of the electric motor as a function of speed of the motor which produces acceleration of the turbine to self-sustaining speed while minimizing a total amount of energy required, represented by an integral of a curve plotting current versus revolutions per minute of the electric motor, for rotating the turbine from zero revolutions per minute to self sustaining speed.

2. A method in accordance with claim 1 wherein:
   the power output characteristic of the motor comprises three speed segments defining a horsepower output of the electric motor beginning from stop with a first segment containing an increasing slope of horsepower as a function of rotational speed of the motor, a second segment containing the set speed and in which a maximum slope of horsepower as a function of rotational speed occurs with rotational speeds in the second segment being greater than rotational speeds in the first segment and a third segment containing a slope of horsepower as a function of rotational speed which is less than the second segment and which contains a maximum horsepower output with rotational speeds in the third segment being greater than rotational speeds in the second segment; and
   the set speed occurs when the electric motor is transferring torque to the input of the clutch during rotation of the motor with a rotational speed within the second segment and the electric motor is not coupled to the turbine in the first segment and is coupled to the turbine at least within the second segment.

3. A method in accordance with claim 2 wherein:
   the electric motor is coupled to the turbine during the third segment.

4. A method in accordance with claim 1 wherein:
   the electric motor draws current during the starting of the turbine with a characteristic of current as a function of rotational speed of the motor having a segment with a current magnitude less than a current which would be drawn by the electric motor if the turbine was being driven by the electric motor from a stop during starting of the turbine at corresponding speeds which occurs prior to torque being transferred from the input to the output of the clutch.

5. A method in accordance with claim 2 wherein:
   the electric motor draws current during the starting of the turbine with a characteristic of current as a function of rotational speed of the motor having a segment with a current magnitude less than a current which would be drawn by the electric motor if the turbine was being driven by the electric motor from a stop during starting of the turbine at corresponding speeds which occurs prior to torque being transferred from the input to the output of the clutch.

6. A method in accordance with claim 3 wherein:
   the electric motor draws current during the starting of the turbine with a characteristic of current as a function of rotational speed of the motor having a segment with a current magnitude less than a current which would be drawn by the electric motor if the turbine was being driven by the electric motor from a stop during starting of the turbine at corresponding speeds which occurs prior to torque being transferred from the input to the output of the clutch.

7. A starting system for a gas turbine comprising:
   an electric motor; and
   a clutch having an input for receiving torque from the electric motor when the electric motor is activated during starting of the turbine and an output for driving the gas turbine during starting of the turbine, the clutch having a torque transfer characteristic between the input and the output with no torque being transferred when a rotational speed of the input is below a set speed which is a fraction of a speed at which the gas turbine is self-sustaining in producing output torque and transferring torque above the set speed between the input and output with the set speed being chosen with respect to a power output characteristic of the electric motor as a function of speed of the motor which produces acceleration of the turbine to self-sustaining speed while minimizing a total amount of energy required, represented by an integral of a curve plotting current versus revolutions per minute of the electric motor, for rotating the turbine from zero revolutions per minute to self sustaining speed.

8. A starting system in accordance with claim 7 wherein:
   the power output characteristic of the motor comprises three speed segments defining a horsepower output of the electric motor beginning from stop with a first segment containing an increasing slope of horsepower as a function of rotational speed of the motor, a second segment containing the set speed and in which a maximum slope of horsepower as a function of rotational speed occurs with rotational speeds in the second segment being greater than rotational speeds in the first segment and a third segment containing a slope of horsepower as a function of rotational speed which is less than the second segment and which contains a maximum horsepower output with rotational speeds in the third segment being greater than rotational speeds in the second segment; and the set speed occurs when the electric motor is transferring torque to the input of the clutch during rotation of the motor with a rotational speed within the second segment and the electric motor is not activated in the first segment and is coupled to the turbine at least within the second segment.

9. A starting system in accordance with claim 8 wherein:

the electric motor is coupled to the turbine during the third segment.

10. A starting system in accordance with claim 1 wherein:

the electric motor draws current during the starting of the turbine with a characteristic of current as a function of rotational speed of the motor having a segment with a current magnitude less than a current which would be drawn by the electric motor if the turbine was being driven by the electric motor from a stop during starting of the turbine at corresponding speeds which occurs prior to torque being transferred from the input to the output of the clutch.

11. A starting system in accordance with claim 8 wherein:

the electric motor draws current during the starting of the turbine with a characteristic of current as a function of rotational speed of the motor having a segment with a current magnitude less than a current which would be drawn by the electric motor if the turbine was being driven by the electric motor from a stop during starting of the turbine at corresponding speeds which occurs prior to torque being transferred from the input to the output of the clutch.

12. A starting system in accordance with claim 9 wherein:

the electric motor draws current during the starting of the turbine with a characteristic of current as a function of rotational speed of the motor having a segment with a current magnitude less than a current which would be drawn by the electric motor if the turbine was being driven by the electric motor from a stop during starting of the turbine at corresponding speeds which occurs prior to torque being transferred from the input to the output of the clutch.

* * * * *